Dec. 11, 1951     J. B. VAN DER WERFF     2,578,160
ROTARY FLUID VALVE

Filed April 1, 1949                              2 SHEETS—SHEET 1

INVENTOR.
JACOB B. VAN DER WERFF
BY HIS ATTORNEYS.
HARRIS, KIECH, FOSTER & HARRIS
BY

Dec. 11, 1951  J. B. VAN DER WERFF  2,578,160
ROTARY FLUID VALVE
Filed April 1, 1949  2 SHEETS—SHEET 2
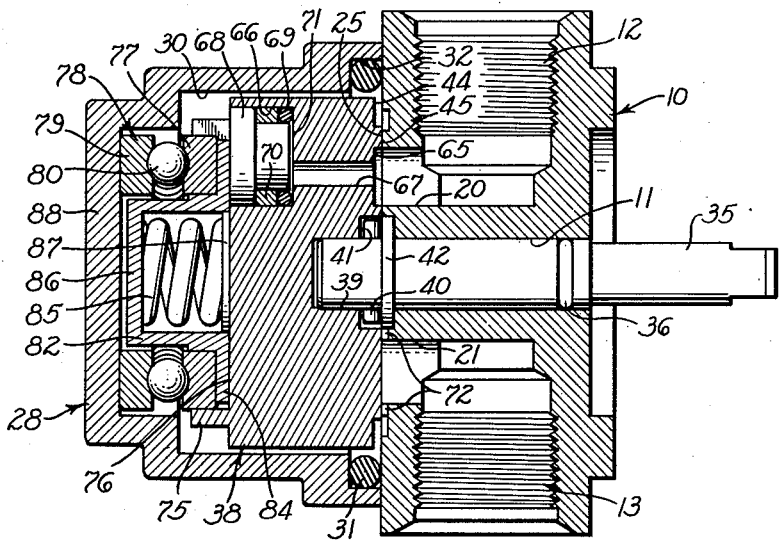
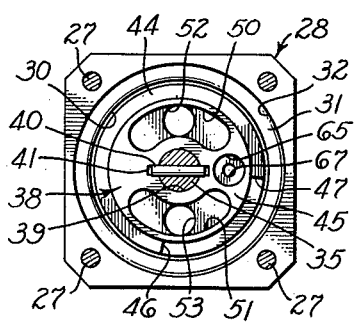
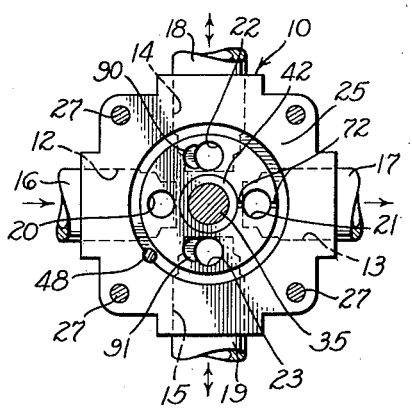
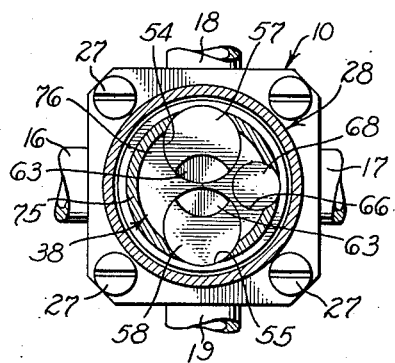
INVENTOR.
JACOB B. VAN DER WERFF
BY HIS ATTORNEYS.
HARRIS, KIECH, FOSTER & HARRIS Patented Dec. 11, 1951

2,578,160

UNITED STATES PATENT OFFICE 2,578,160

ROTARY FLUID VALVE

Jacob B. Van Der Werff, Burbank, Calif., assignor to General Metals Corporation, a corporation of California Application April 1, 1949, Serial No. 84,794

15 Claims. (Cl. 251—85)

This invention relates generally to the fluid valve art, and more particularly, to a rotary valve of the porting plate type commonly referred to as a selector valve.

Rotary selector valves of the porting plate type are generally old and well known in the art, having been used extensively, for example in hydraulic systems, to supply and control the flow of fluid to hydraulic jacks and other actuating devices. Such valves are generally provided with a plurality of fluid ports communicating with a rotatable control plate which is also provided with passages to direct the flow of fluid between the ports as desired in response to rotation of the plate. Many such prior valves have been designed to operate in systems employing relatively low pressure fluids and are quite efficient when applied to such use. However, it has been determined that conventional porting plate type selector valves which operate successfully in low pressure fluid systems are wholly unsuitable for use in high pressure fluid systems, such as for example, aircraft hydraulic systems in which fluid operating pressure in excess of 1000 pounds per square inch are common, the reason being that such valves are subject to leakage of the fluid between the ports.

In an effort to avoid this condition, various rotary plate selector valves have been proposed for use in high pressure fluid systems but it is common knowledge that they are not entirely efficient. Such valves are provided with various sealing devices intended to prevent leakage of fluid between the different fluid ports but this sealing problem has not been successfully solved so far as I am aware. The sealing means of such valves usually comprise sealing elements slidably disposed within or adjacent the fluid ports of the valve body and urged against the rotary valve plate by spring means, fluid pressure exerted thereagainst, or both. In order to provide a seal which is effective in preventing leakage of the fluid, it is necessary that the sealing elements be relatively large and that a force of high magnitude be applied thereagainst to maintain the elements in firm engagement with the rotary valve plate. It is apparent, therefore, that a relatively great force is required to rotate the valve plate and, in some cases, this precludes manual operation of the valve, or at least makes it necessary to employ a long operating handle in order to obtain the inch-pounds of manually applied torque necessary to overcome the frictional resistance to rotation of the valve plate. Various attempts have been made to obviate this condition by providing means for controlling the pressure of the sealing means against the rotary valve plate so as to effect a substantially balanced condition wherein excessive pressure of the sealing elements against the valve plate is avoided. However, due to the fact that such valves may be used in fluid systems employing a wide range of fluid pressures, it is necessary to specially design a large variety of valves, each suitable for use in a system utilizing a particular fluid pressure. Moreover, since the sealing means are disposed radially outward from the axis of rotation of the valve plate and the pressures applied against the elements at opposite sides of the axis are unequal, a couple is produced which tends to tilt or cant the valve plate, thus causing uneven wear thereof to destroy the sealing effect. Thus, while such selector valves may be quite efficient in low pressure fluid systems, they are wholly unsuited for and incapable of use in systems wherein fluid pressure in excess of 1000 pounds per square inch is developed.

It is a primary object of my invention to obviate the deficiencies of prior selector valves by providing a valve of the rotary porting plate type which is designed for operation in relatively high pressure fluid systems.

Another object is to provide a valve, of the character referred to, which embodies means effecting a fluid-tight seal between the rotary valve plate and the stationary valve port member so as to prevent leakage of the fluid from the fluid line into which the pressure fluid is directed.

Another object is to provide a valve of the type indicated in which the valve plate is effectively maintained in sealing engagement with the stationary valve port member at all times. This object is best attained by applying fluid pressure against both sides of the valve plate and so proportioning the effective pressure areas of the plate that the force tending to maintain the plate in sealing engagement is slightly in excess of the force tending to separate the plate and port member, thereby effecting a substantially balanced condition and reducing the friction between these components and making it possible to rotate the valve plate with little manually applied torque, regardless of the fluid pressure in the system in which the valve is incorporated.

A further object is to provide a rotary selector valve of the class designated in which the fluid pressure applied against the opposite sides of the rotary valve plate is so proportioned and distributed that even though it is applied against an area spaced radially outward from the center of the valve plate a couple is avoided and there exists no tendency for the valve plate to tilt and allow leakage of fluid between the valve passages and to cause uneven wear of the valve components.

A further object is to provide a rotary selector valve which may employ spring means for maintaining the rotatable valve plate in sealing engagement with the stationary valve port member so that the fluid pressure applied against the opposite sides of the valve plate may be equal and the plate thus effectively balanced.

A still further object is to provide a rotary selector valve which is relatively simple in construction, particularly easy to operate, one which is adapted for use in high pressure fluid systems, and one which is highly efficient in performing its intended function.

Further objects of the invention will appear from the following description and from the drawings, which illustrate a preferred embodiment of the valve, by way of example. In the drawings:

Fig. 4 is a similar view, taken on line 4—4 of Fig. 3;

Fig. 5 is a cross-sectional view, taken on line 5—5 of Fig. 3;

Fig. 6 is a cross-sectional view, taken on line 6—6 of Fig. 3; and

Fig. 7 is a cross-sectional view, taken on line 7—7 of Fig. 3.

Figure 1:
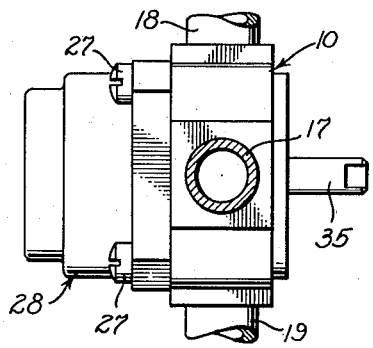
Fig. 1 is a side elevational view of my improved rotary selector valve.
Figure 2:
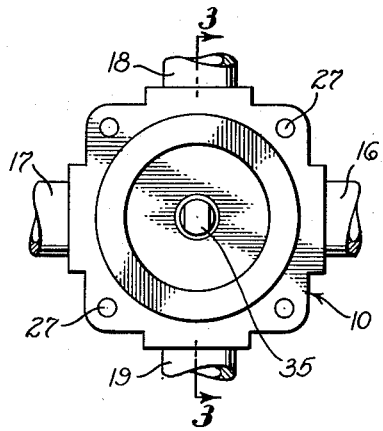
Fig. 2 is a view of the operating end of the valve.

Referring to the drawings in detail, my improved rotary fluid valve comprises a stationary valve port member 10 which is in the form of a substantially square block having a bore 11 therein, the respective four sides of the block being provided with threaded openings 12, 13, 14 and 15 which are adapted to receive fluid lines 16, 17, 18 and 19 (Figs. 1 and 2). The openings 12, 13, 14 and 15 are respectively provided with ports 20, 21, 22 and 23 which extend parallel to the axis of the bore 11. The ports 20 to 23 lead to the inner valve face 25 of the member 10, this face being smoothly finished. The valve herein illustrated is particularly adapted for use in a high pressure hydraulic system such as employed, for example, in aircraft for operating actuating jacks and other hydraulic equipment, and will be described in connection with such a system, by way of example. In such a hydraulic installation, the line 16 may be connected to a source of pressurized fluid, the line 17 connected to a fluid reservoir, the line 18 connected to one end of a hydraulic actuating cylinder, and the line 19 connected to the other end of the actuating cylinder. The respective valve ports are, for this reason, hereinafter referred to as the fluid inlet or pressure port 20, the fluid outlet or return port 21, the first cylinder port 22 and the second cylinder port 23.

Secured to the valve port member 10, against the valve face 25 thereof, by screws 27, is a casing 28 which defines, with the valve face 25, a substantially cylindrical closed chamber 30. A resilient sealing ring 31 disposed in a recess 32 of the casing and compressed against the valve face 25 seals the chamber 30 against leakage of fluid therefrom.

Rotatable in the bore 11 of the stationary valve port member 10 is a shaft 35, to the outer end of which a handle (not shown) may be attached. A resilient sealing ring 36 is disposed in a peripheral groove of the shaft 35 and engages the bore 11 to prevent leakage of fluid around the shaft. The shaft 35 extends through the member 10 into the chamber 30 and supports a rotary valve plate member 38, the inner end of the shaft being disposed in an axial hole 39 of the plate member. A cross-pin 40 carried by the shaft 35 engages in a transverse slot 41 in the plate member 38 to key the member to the shaft for rotation therewith. The pin 40 bears against a washer 42 disposed in an axial recess in the face 25 of the member 10.

Figure 3:
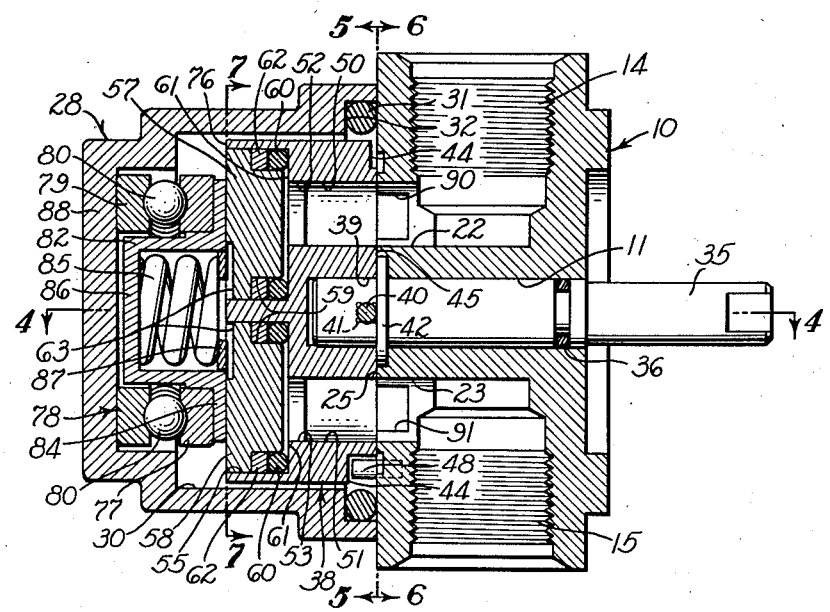
Fig. 3 is an enlarged longitudinal sectional view, taken on line 3—3 of Fig. 2.

The valve plate member 38 consists of a relatively thick, circular, plate which has an annular groove 44 in its forward face 45, adjacent the periphery thereof. A portion of the groove 44 is made relatively deep so as to provide circumferentially spaced stop shoulders 46 and 47 which are arranged 90 degrees apart (Figs. 3 and 5). The shoulders 46 and 47 are adapted to engage a stop pin 48 carried by the stationary valve port member 10 so as to limit the rotary movement of the valve plate member 38 to 90 degrees, or a quarter revolution.

Formed in the forward face 45 of the rotary valve plate member 38 are arcuate recesses or passages 50 and 51 which are disposed at opposite sides of the axis of the member and concentric thereto. Orifices 52 and 53, are drilled rearwardly at the midportions of the respective passages. The orifices 52 and 53 communicate between the respective passages 50 and 51 and counterbores 54 and 55 in the rearward face of the valve plate member 38, as shown in Fig. 3.

Slidable in the counterbores 54 and 55 are pressure plugs 57 and 58 which have reduced inner ends 59 around which are positioned resilient sealing rings 60 adapted to engage against the inner ends or shoulders 61 of the counterbores and to be compressed between these shoulders and the plugs to prevent leakage of fluid rearwardly through the counterbores, backing rings 62 being interposed between the rings and the enlarged portions of the plugs. The rearward faces of the slidable pressure plugs 57 and 58 are provided with clearance recesses 63, for the purpose to be later explained.

A shallow circular recess 65 is provided in the face 45 of the valve plate member 38 and is arranged between the adjacent ends of the arcuate passages 50 and 51 on an imaginary arcuate center line drawn through the passages, the recess being of a diameter equal to the width of the passages. Communicating between the recess 65 and a counterbore 66 in the back of the valve plate member 38 is an orifice 67 (Figs. 4 and 5). Slidable in the counterbore 66 is a pressure plug 68 provided with a sealing ring 69 and backing ring 70, the sealing ring being adapted to engage against the inner end face 71 of the counterbore. A radial groove 72 is cut in the face 25 of the valve port member 10 and which communicates between the slot 41 and the annular groove 44.

The valve plate member 38 is provided with an annular extension 75 on its rearward face 76, the extension receiving one race 77 of an antifriction thrust bearing 78 which has a second race 79 and balls 80 revolvable between the two races. A thimblelike holder member 82 is disposed within the thrust bearing 78 and is provided with an annular flange 84 disposed between the thrust bearing and the rearward face 76 of the valve plate member 38. Pocketed within the holder member 82 is a compression spring 85 which is compressed slightly between the end wall 86 of the holder and a washer 87 which, in turn, bears against the rearward face 76 of the valve plate member. It will be seen, by reference to Figs. 3 and 4, that due to the action of the spring 85 the valve plate member 38 is urged forwardly and the thrust bearing 78 is forced rearwardly against the wall 88 of the casing 28. By this action, the valve plate member 38 normally is maintained lightly pressed against the valve port member 10. It should be explained at this point that the thickness of the valve plate member 38, that is, the distance between its forward and rearward faces 45 and 76 is less, by a few thousandths of an inch, than the distance between the forward end of the holder member 82 and the rearward face 25 of the stationary member 10 so that the valve plate member 38 is capable of sliding axially through a very small distance. It is also to be noted that the thrust bearing assembly, including the bearing 78 and holder 82, is held against the end wall 88 and for this reason the holder member is stationary so far as axial movement is concerned.

It will be apparent to those skilled in the art that the present improved valve is relatively simple in construction and operation, it being only necessary to rotate the shaft 35 through a quarter revolution. The various components of the valve are simple to manufacture and easy to assemble and disassemble. Removal of the screws 27 permits the thrust bearing 78, the holder 82, the spring 85 and the valve plate member 38 to be removed from the casing 28, whereupon the valve plate member can be disconnected from the operating shaft 35 by merely disengaging the cross-pin 40 from the transverse slot 41. The sealing means 31 and 60, and the plugs 57, 58 and 68, then may be readily withdrawn. Consequently, any of the parts may be easily removed for inspection, replacement or repair and, since no special fitting of the parts is necessary, the assembling of the components can be carried out by an unskilled worker. In this respect, it is to be noted that the parts 38, 82 and 78 are, in effect, floatingly mounted within the chamber 30 so that accurate fitting of the rotary valve elements in bores is unnecessary. The components themselves, on the other hand, are precision made to close tolerances. The operation of my improved rotary fluid valve is explained as follows:

Assuming that the shaft 35 and the valve plate member 38 are in the position illustrated in the drawings, the valve is in neutral position. That is to say, the high pressure line 16 and port 20 are not connected by the arcuate passages 50 or 51 to either of the cylinder ports 22 or 23 so that flow of fluid through the valve is prevented. Referring to Fig. 4, when the valve plate member 38 assumes a neutral position, the recess 65, orifice 67 and plug 68 are in alignment with the high pressure port 20. Consequently, pressure is applied against the inner face of the plug 68 and this causes the plug to slide rearwardly in the counterbore 66. The permissible movement of the plug in this direction is very slight however, since the rearward face of the plug engages the flange 84 of the holder member 82 which, as explained before, is fixed so far as axial movement is concerned. Movement of the plug 68 in the counterbore 66 allows the pressure fluid to enter the counterbore between the forward end of the plug and the face or shoulder 71 of the counterbore. There pressure is applied against the entire face 71, the result of this application of pressure causing the valve plate member 38 to be forced toward the right, as viewed in Fig. 4, so as to maintain its forward face 45 in engagement with the rearward face 25 of the stationary valve port member 10, the force exerted by the pressure against the face 71 being augmented by the force of the spring 85. It will be noted, however, that the fluid pressure is also applied against the annular face of the recess 65, this force tending to move the rotary valve plate member 38 toward the left. Since the effective pressure area of the recess 65 is somewhat less than the effective pressure area of the face 71, the resultant of the pressure applied against opposite sides of the valve plate member 38 causes the member to be held effectively against the member 10 so as to prevent leakage of the high pressure fluid between the faces 25 and 45. In other words, the force tending to maintain the valve plate member 38 in engagement with the valve port member 10 is slightly in excess of the force tending to separate these members so that a fluid-tight seal is produced. In addition, the valve plate member 38 is substantially balanced by the fluid pressure exerted against the face 71 on the one hand and the fluid pressure applied against the face of the recess 65 plus the force of the spring 85 on the other hand so that a couple, which would otherwise tend to tilt the valve plate member and cause leakage of the fluid, is entirely avoided and wear which may occur between the members 10 and 38 is equalized.

When it is desired, for example, to apply fluid pressure within a first end of an actuating cylinder through the line 18 and to relieve the fluid pressure in the other or second end of the cylinder to which the line 19 is connected, the shaft 35 is rotated, by means of a suitable handle, in clockwise direction as viewed in Figs. 2 and 5, through 45 degrees. Since the valve plate member 38 is substantially balanced, rotation of the valve plate member is accomplished with a minimum of physical effort on the part of the operator.

During the initial part of the rotation of the valve plate member 38, the recess 65 thereof remains in fluid communication with the fluid pressure port 20 and the valve plate member thus remains substantially balanced to facilitate turning of the valve plate member. Prior to disalignment of the recess 65 and pressure port 20, the right-hand end of the arcuate fluid passage 50 registers with the port 20 so that fluid pressure is, at this juncture, applied against both the face of the recess 65 and the inner face of the passage 50. The pressure thus applied against the forward side of the valve plate member is counteracted by fluid pressure exerted against the face 71 and the face 61 of the counterbore 54. Since the effective pressure area of the face 61 is equal to or slightly greater than the effective pressure area of the arcuate passage 50, the valve plate member 38 remains substantially balanced to permit easy rotation thereof while maintaining the members 10 and 38 in fluid-tight engagement to prevent leakage of fluid from one port to another.

As clockwise rotation of the valve plate member 38 is continued, the recess 65 moves out of alignment with the pressure port 20 and the arcuate passage 50 moves into full registry with the port 20 and, since the passage 50 also communicates with the first cylinder port 22, the fluid is caused to flow from the line 16 into the line 18 leading to the first end of the actuating cylinder, If a small amount of the pressure fluid should escape between the faces 25 and 45 during the turning of the valve plate member 38, it will flow into the chamber 30 from which area it will be directed into the return port 21 by way of the groove 72 (Figs. 4 and 5). As the arcuate passage 50 is brought into fluid communication with the fluid inlet port 20 and the first cylinder port to cause pressure fluid to enter the first end of the actuating cylinder, the opposite arcuate passage 51 moves to a position where it is in fluid communication with the second cylinder port 23 and the fluid return or discharge port 21 so as to permit discharge of fluid from the second end of the actuating cylinder.

Fluid pressure within the arcuate passage 50 is exerted simultaneously against the flat bottom surface of the passage and against the inner end of the plug 57, by way of the orifice 52. The fluid pressure exerted against the plug 57 tends to force the latter toward the left as viewed in Fig. 3 whereupon it engages the flange 84 of the holder 82. The surface 61 of the counterbore 54 is thus exposed to the fluid pressure which acts between this surface and the inner end of the plug 57 to counteract the force applied against the bottom surface of the arcuate passage 50 and thus balance the valve plate member 38, the effective pressure area of the face 61 being equal to or slightly greater than the effective pressure area of the passage 50. The valve plate member 38 thus is maintained in engagement with the rearward face 25 of the stationary port member 10.

As will be understood by those versed in the art, the fluid pressure is distributed evenly against the bottom surface area of the passage 50 but must be regarded as concentrated at the center of area of this surface for the purpose of establishing perfect balancing of the valve plate member. As will be apparent, the center of this area is located on a radial line extending from the axis of rotation of the valve plate member 38 through the center of the orifice 52 and spaced radially inward from the center of the orifice. Consequently, it can be assumed that fluid pressure applied against the bottom surface area of the passage 50 is concentrated at this center of area and that the total applied pressure multiplied by the moment arm (distance of the center of area to the axis of rotation of the valve plate member) produces torque tending to tilt the valve plate member on a transverse axis within the chamber. To offset the tendency of the valve plate member 38 to tilt in the chamber, which would permit uneven wear of the valve surfaces 25 and 45 and leakage of fluid therebetween, it is necessary that the force applied against the opposite or rearward side of the valve plate member be not only equal in magnitude to the pressure applied against the surface of the passage 50 but also applied against an area of the member whose center of area aligns with the center of area of the surface of the passage. To attain this relationship, the center of the surface 61 and the plug 57 is disposed radially inward from the center of the orifice 52 or, in other words, in alignment with the center of area of the surface of the passage 50. It is thus apparent that equal forces are applied at directly opposite points of the valve plate member so that a couple is avoided and the face 45 of the valve plate member 38 is maintained parallel to and in light engagement with the face 25 of the member 10.

After the piston of the actuating cylinder has been actuated through the desired extent, the shaft 35 and valve plate member 38 are rotated in counterclockwise direction through 45 degrees to restore the valve to neutral position wherein the recess 65 overlies the fluid pressure port 20 and flow of fluid through either line 18 or 19 is prevented and the piston of the actuating cylinder is locked in the selected position.

To obtain reverse flow, that is, to cause pressure fluid to flow through lines 16 and 19 to the second end of the actuating cylinder and to discharge from the first end of the cylinder through the lines 18 and 17, the valve shaft 35 is rotated in counterclockwise direction so as to cause the arcuate passage 51 to register with the ports 20 and 23. At the same time, the arcuate passage 50 registers with the ports 22 and 21 so that fluid can flow to the first end of the cylinder and discharge from the second end of the cylinder. During the rotation of the valve plate member 38 in this direction, the member is maintained lightly engaged with the rearward face 25 of the member 10 and balanced by the fluid pressure applied against the bottom surface of the passage 51 and against the rearward face of the plug 58 and the surface 61 of the counterbore 55 (Fig. 3). As in the case of the plug 57, the center of the plug 58 is located in alignment with the center of area of the effective pressure area of the passage 51 so that the valve plate member is stabilized so far as tilting in the chamber 30 is concerned.

It has been determined that the handle load required to operate the valve can be further reduced by cutting angular bleed passages 90 and 91, in the face 25 of the valve port member 10, these passages communicating respectively with the ports 22 and 23 (Figs. 4 and 6). The passages 90 and 91 function to bleed off the fluid pressure from the reaction disc 68 as the valve plate member 38 is moved from neutral position to either of its extreme operating positions. By this means, as the valve plate member 38 approaches an extreme position, only those forces centering around the arcuate passages 50 or 51 must be contended with, whereas without these bleed passages both the forces applied to portions surrounding the passages 50 and 51 and within the pressure hole 65 must be taken into consideration. Referring to Figs. 4 and 6, the return port 21 is made slightly larger than the pressure port 20 so that as each of the arcuate passages 50 and 51 approaches the return port, it is permitted to release its fluid pressure before the other arcuate passage approaches the pressure port 20, this provision further aiding in reducing the required handle load.

It will be apparent from the foregoing that the present valve is simple in construction and positive and highly efficient in operation. As a particular feature of the invention, the rotary valve plate member is balanced by fluid pressure applied against the opposite sides thereof so that the valve can be operated with very little physical effort on the part of the operator. In this respect, it has been determined that a valve constructed in accordance with my invention is particularly adapted for use in fluid systems employing relatively high pressures and that regardless of these pressures, the valve may be operated by relatively low torque loads. For example, a selector valve of the type disclosed herein may be employed with a fluid pressure of 7500 p. s. i. and operated in response to a torque of approximately 48 inch pounds applied to the valve shaft and valve plate member by a conventional handle carried by the shaft. It has been found that the rate of increase on the applied handle load is approximately 4 inch pounds torque per 1000 p. s. i. increments, starting with 6 inch pounds at zero p. s. i. It is thus apparent that graphically plotted the handle load increase produces a relatively flat curve and that a balanced valve of this type installed in a system employing fluid pressures as high as 10,000 p. s. i. can be readily operated.

The present rotary fluid valve is unique in that it employs a substantially balanced rotary valve plate member which is pressure loaded sufficiently to prevent leakage of fluid but insufficiently to create prohibitive resistance to the manual rotation of the valve plate member. Besides being adapted for operation with relatively high fluid pressures, the present valve is small and light in weight to adapt it for use in aircraft hydraulic systems. Moreover, the valve has nonleaking characteristics and at the same time eliminates interflow between the valve ports so that it is highly efficient in operation.

I claim as my invention:

1. In a fluid valve, the combination of: a valve port member having a planar face and an inlet port and a discharge port, said ports communicating with said face; a plate member movable against said face and having at least one arcuate fluid passage in its side disposed against said face, a counterbore in the other side thereof and an orifice communicating between said counterbore and said arcuate fluid passage, the effective pressure area of the bottom of said counterbore being slightly greater than the effective pressure area of the bottom of said arcuate fluid passage, said plate member being movable to a first position in which said passage communicates between said inlet and discharge ports and to a second position in which said passage communicates with said discharge port but is out of communication with said inlet port; a plug member disposed in said counterbore, said plug member and said plate member being relatively slidable; stop means adapted to be engaged by said plug to limit the sliding movement thereof in said counterbore in a direction toward said other side of said plate member in response to pressure fluid introduced into said counterbore by way of said arcuate passage and said orifice, when said plate member is in said first position, so as to cause movement of said plate member toward said valve port member and retain said plate member lightly engaged with said face of said valve port member in response to fluid pressure applied against said bottom area of said counterbore; and operating means for moving said plate member.

2. In a fluid valve, the combination of: a valve port member having a planar face and an inlet port and a discharge port, said ports communicating with said face; a plate member movable against said face and having at least one arcuate fluid passage in its side disposed against said face, a counterbore in the other side thereof and an orifice communicating between said counterbore and said arcuate fluid passage, the effective pressure area of the bottom of said counterbore being slightly greater than the effective pressure area of the bottom of said arcuate fluid passage and the axis of said counterbore passing through the center of area of said bottom surface of said arcuate fluid passage, said plate member being movable to a first position in which said passage communicates between said inlet and discharge ports and to a second position in which said passage communicates with said discharge port but is out of communication with said inlet port; a plug member disposed in said counterbore, said plug member and said plate member being relatively slidable; stop means adapted to be engaged by said plug to limit the sliding movement thereof in said counterbore in a direction toward said other side of said plate member in response to pressure fluid introduced into said counterbore by way of said arcuate passage and said orifice, when said plate member is in said first position, so as to cause movement of said plate member toward said valve port member and retain said plate member lightly engaged with said face of said valve port member in response to fluid pressure applied against said bottom area of said counterbore; and operating means for moving said plate member.

3. In a fluid valve, the combination of: a valve port member having a planar face and an inlet port and a discharge port, said ports communicating with said face; a plate member movable against said face and having at least one arcuate fluid passage in its side disposed against said face, a counterbore in the other side thereof and an orifice communicating between said counterbore and said arcuate fluid passage, the effective pressure area of the bottom of said counterbore being slightly greater than the effective pressure area of the bottom of said arcuate fluid passage and the axis of said counterbore passing through the center of area of said bottom surface of said arcuate fluid passage, said plate member being movable to a first position in which said passage communicates between said inlet and discharge ports and to a second position in which said passage communicates with said discharge port but is out of communication with said inlet port; a plug member disposed in said counterbore, said plug member and said plate member being relatively slidable; stationary stop means adapted to be engaged by said plug to limit the sliding movement thereof in said counterbore in a direction toward said other side of said plate member in response to pressure fluid introduced into said counterbore by way of said arcuate passage and said orifice, when said plate member is in said first position, so as to cause movement of said plate member toward said valve port member and retain said plate member lightly engaged with said face of said valve port member in response to fluid pressure applied against said bottom area of said counterbore; and operating means for moving said plate member.

4. In a fluid valve, the combination of: a valve port member having a planar face and an inlet port and a discharge port, said ports communicating with said face; a plate member movable against said face and having at least one arcuate fluid passage in its side disposed against said face, a counterbore in the other side thereof and an orifice communicating between said counterbore and said arcuate fluid passage, the effective pressure area of the bottom of said counterbore being slightly greater than the effective pressure area of the bottom of said arcuate fluid passage and the axis of said counterbore being disposed on a radial line bisecting said arcuate passage and passing through the center of area of said bottom surface of said arcuate fluid passage, said plate member being movable to a first position in which said passage communicates between said inlet and discharge ports and to a second position in which said passage communicates with said discharge port but is out of communication with said inlet port; a plug member disposed in said counterbore, said plug member and said plate member being relatively slidable; stop means adapted to be engaged by said plug to limit the sliding movement thereof in said counterbore in a direction toward said other side of said plate member in response to pressure fluid introduced into said counterbore by way of said arcuate passage and said orifice, when said plate member is in first position, so as to cause movement of said plate member toward said valve port member and retain said plate member lightly engaged with said face of said valve port member in response to fluid pressure applied against said bottom area of said counterbore; and operating means for moving said plate member.

5. The combination defined in claim 1 including sealing means within said counterbore for preventing leakage of fluid from said counterbore.

6. The combination defined in claim 1 in which said plug has a reduced inner end, and including a resilient sealing ring surrounding said reduced end and engageable with the wall defining said counterbore.

7. The combination defined in claim 1 in which said operating means includes: a shaft rotatable in said valve port member and having an end disposed in an axial hole in said plate member; and key means on said end of said shaft engaged in a slot in said plate member.

8. The combination defined in claim 1 including a casing detachably secured to said valve port member and defining with said planar face a chamber, said plate member being disposed in said chamber.

9. The combination defined in claim 1 and including a dome-shaped casing detachably secured to said valve port member and defining with said planar face a chamber in which said plate member is disposed, said casing having an end wall, said stop means comprising an axial thrust bearing disposed between said end wall and said plate member, said plug member being adapted to engage said thrust bearing.

10. The combination defined in claim 1 and including a dome-shaped casing detachably secured to said valve port member and defining with said planar face a chamber in which said plate member is disposed, said casing having an end wall, said stop means comprising an axial thrust bearing disposed between said end wall and said plate member, said plug member being adapted to engage said thrust bearing, said valve also including spring means engageable between said thrust bearing and said plate member and operative to force said plate member lightly against said planar face.

11. In a rotary fluid valve, the combination of: a valve port member having a planar face, a first port and a second port, said ports communicating with said face; a plate member rotatable against said face and having a first arcuate fluid passage in its side disposed against said face, a first counterbore in the other side thereof and a first orifice communicating between said first counterbore and said first arcuate passage, the effective pressure area of the bottom of said first counterbore being slightly greater than the effective pressure area of the bottom of said first arcuate passage, said plate member also having a recess in its side disposed against said planar face, a second counterbore in the other side thereof and a second orifice communicating between said recess and said second counterbore, the effective pressure area of the bottom of said second counterbore being slightly greater than the effective pressure area of said recess; first and second plug members slidable respectively in said first and second counterbores, said plate member being rotatable to a first position in which said arcuate passage communicates between said first and second ports and to a second position in which said passage communicates with said second port but is out of communication with said first port and in which said recess communicates with said first port; stop means adapted to be engaged by said first and second plug members to limit the sliding movement thereof in said counterbores in a direction toward said other side of said plate member in response to pressure fluid introduced respectively into said first and second counterbores by way of said arcuate passage and first orifice and by way of said recess and said second orifice when said plate member is respectively in said first and second positions, so as to cause movement of said plate member toward said valve port member and retain said plate member lightly engaged with said planar face in response to the differential fluid pressure applied against said bottom areas of said first or second counterbores and against the bottom areas of said first arcuate passage or said recess; and operating means for rotating said plate member.

12. In a rotary fluid valve, the combination of: a valve port member having a planar face, a first port, a second port, a third port and a fourth port, said ports communicating with said face; a plate member rotatable against said face and having a first arcuate passage; a second arcuate passage and a recess in its side disposed against said face, said passages being disposed at opposite sides of the axis of rotation of said plate member and said recess being disposed between adjacent ends of said first and second passages, said plate member also having a first counterbore, a second counterbore and a third counterbore in its other side and first, second and third orifices communicating respectively between said first passage and said first counterbore, between said second passage and said second counterbore and between said recess and said third counterbore, the effective pressure areas of the bottom of each counterbore being slightly greater than the effective pressure area of the corresponding passage or recess; a plug member slidable in each of said counterbores, said plate member being rotatable to a first position in which said first arcuate passage communicates between said first and second ports and said second arcuate passage communicates between said third and fourth ports, to a second position in which said first and second passages respectively communicate only with said second and fourth ports, and to a third position in which said first passage communicates between said second and third ports and said second passage communicates between said first and fourth ports; stop means adapted to be engaged by said plug members to limit the sliding movement of said plug members in their respective counterbores in response to pressure fluid introduced respectively into said first, second and third counterbores when said first and second passages and said recess are moved into fluid communication with said first port upon rotation of said plate member to the positions named, so as to cause movement of said plate member toward said valve port member and retain said plate member lightly engaged with said planar face in response to the differential in fluid pressure applied against said bottom areas of said counterbores and against the bottom areas of said first or second passages or said recess; and operating means for rotating said plate member.

13. The combination defined in claim 12 and including a casing detachably secured to said valve port member and defining with said planar face a chamber, said plate member being disposed in said chamber and having a groove in its face disposed adjacent said planar face, said groove communicating between the chamber and said fourth port.

14. The combination defined in claim 12 in which said operating means comprises a shaft rotatable in said port member and operatively connected to said plate member.

15. The combination defined in claim 12 and including a casing detachably secured to said valve port member and defining with said planar face a chamber, said plate member being disposed in said chamber and having a groove in its face disposed adjacent said planar face, said groove communicating between the chamber and said fourth port, said stop means comprising an axial thrust bearing disposed in said chamber against a wall thereof in axial alignment with said plate member, said valve also including spring means engageable between said thrust bearing and said plate member.

JACOB B. VAN DER WERFF.

No references cited.